3,825,573
PURIFICATION OF α,α-DISUBSTITUTED-β-PROPIOLACTONES

William A. Ames, Longview, and James J. Ward, Henderson, Tex., assignors to Eastman Kodak Company, Rochester, N.Y.
No Drawing. Filed Dec. 16, 1971, Ser. No. 208,906
Int. Cl. C07d 3/00
U.S. Cl. 260—343.9
10 Claims

ABSTRACT OF THE DISCLOSURE

Polymerization grade α,α-disubstituted-β-propiolactone monomer having the general formula $$\begin{array}{c} R^1 \\ | \\ R-C-C=O \\ | \quad | \\ H_2C-O \end{array}$$

wherein R and R¹ are selected from the group consisting of straight- or branched-chain alkyl groups of from 1 to 10 carbon atoms, substituted of unsubstituted cyclic hydrocarbon groups of from 6 to 10 carbon atoms, or wherein R and R¹ join to form a ring of from 6 to 10 carbon atoms, is effectively obtained from impure monomer containing residual manufacturing impurities by treating the impure lactone monomer with an aluminum alkyl of the formula AlR²₃ wherein R² is a lower alkyl group of from 1 to 8 carbon atoms, and subsequently distilling the purified monomer from the resultant solution at reduced pressure. The procedure yields a very pure polymerization grade α,α-disubstituted-β-propiolactone monomer which has a low polymerization index and from which a polymer having a high inherent viscosity can be formed.

---

This invention relates to the purification of β-lactones. More particularly, this invention relates to the purification of β-lactones such as, for example, α,α-disubstituted-β-propiolactones by treating the impure material with an effective amount of an aluminum alkyl.

It is well known that β-lactones are important as intermediates for the production of synthetic chemicals, polymer products, pharmaceuticals, and the like. The α,α-disubstituted-β-propiolactones are of particular interest in the high polymer industry since they can be used as starting materials for the production of synthetic resins and fibers which have many novel and desirable properties. However, for the lactones to be useful in the preparation of commercial polymers, they must be of very high purity and quality. Because of their extremely high reactivity due to the strained four-membered ring, the α,α-disubstituted-β-propiolactones cannot be purified by typical procedures used for other monomers. For example, unlike the alkylvinyl ethers, the α,α-disubstituted-β-propiolactones cannot be purified by refluxing over alkali metal because they will polymerize under these conditions. Other compounds frequently used for monomer purification either initiate polymerization of the lactone or are too inefficient.

Various procedures have been disclosed for purifying α,α-disubstituted-β-propiolactones. However, they suffer from the defects of either being quite complicated, laborious, or inefficient. For example, British Patent 1,122,939, issued to Shell Research, describes a method of purifying pivalolactone by extraction with 2% aqueous Na₂CO₃ followed by two extractions with H₂O and triple distillation of the organic phase in the presence of picric acid.

Thus, in view of the aforementioned deficiencies of known methods of purification of α,α-disubstituted-β-propiolactone, a need exists for a simple and effective method of obtaining polymerization grade α,α-disubstiuted-β-propiolactone.

Therefore, it is an object of this invention to provide a process for obtaining polymerization grade β-lactones.

Another object of this invention is to provide a process for obtaining polymerization grade α,α-disubstituted-β-propiolactones which is simple and produces a high yield of polymerization grade material.

These and other objects and advantages of this invention will become apparent from the following description and appended claims.

In accordance with this invention it has been found that β-lactones, and especially α,α-disubstituted-β-propiolactones having the general formula $$\begin{array}{c} R^1 \\ | \\ R-C-C=O \\ | \quad | \\ H_2C-O \end{array}$$

wherein R and R¹ are selected from the group consisting of straight- or branched-chain alkyl groups of from 1 to 10 carbon atoms (i.e., methyl, ethyl, propyl, isopropyl, n-butyl, isobutyl, etc.), substituted or unsubstituted cyclic hydrocarbon groups of from 6 to 10 carbon atoms (i.e., cyclohexyl, benzyl, phenyl, naphthyl, etc.), or wherein R and R¹ join to form a ring of from 6 to 10 carbon atoms (i.e., radicals having the formula $$-CH_2-(CH_2)_n-CH_2-$$

where $n$ is a positive integer of from 3–7, or $$-CH=CH(CH_2)_2CH_2-$$

or the like), can be effectively purified to yield polymerization grade monomer by treating the impure α,α-disubstituted-β-propiolactone containing residual manufacturing impurities with an aluminum alkyl having the formula AlR²₃ wherein R² is a straight- or branched-chain alkyl group of 1 to 8 carbon atoms, and distilling the resultant solution at a reduced pressure. In a preferred embodiment R and R¹ represent straight- or branched-chain alkyl groups of from 1 to 4 carbon atoms. This procedure will yield a very pure polymerization grade α,α-disubstituted-β-propiolactone monomer which possesses a low polymerization index and from which a polymer having a high inherent viscosity can be formed. When used in this specification, polymerization index is considered to be simply a measure of the purity and polymerizability of the monomer. Typically, for pivalolactone, it is defined as the time (in seconds) required for ten grams of pivalolactone containing 0.50 ml. of 0.100N tetrabutylammonium iodide in acetone to begin polymerizing when placed on a steam cone in an aluminum moisture dish. As will be appreciated, high molecular weight polymer can be made only from very pure monomer, hence, monomer with a low polymerization index is very desirable. Thus, monomer suitable for polymerization should exhibit a very low polymerization index, preferably less than 15 seconds, since, generally, the lower the value of the polymerization index the greater the monomer purity.

Suitable α,α-disubstituted-β-propiolactones that can be purified in accordance with this invention include α,α-dimethyl-β-propiolactone (pivalolactone); α,α-diethyl-β-propiolactone; α,α-dipropyl-β-propiolactone; α,α-diisopropyl-β-propiolactone; α,α-dibutyl - β - propiolactone; 2-ethyl-2-methylhydracrylic acid β-lactone; 2-(2,2-dimethyloctyl)-2-methylhydracrylic acid β-lactone; 2-(2-ethylhexyl)-2-ethylhydracrylic acid β-lactone; 2-cyclohexyl-2-propylhydracrylic acid β-lactone; 2-phenyl-2-methylhydracrylic acid β-lactone; 2-benzyl-2-methylhydracrylic acid β-lactone; 2,2-pentamethylene-β-propiolactone, and the like. These may be prepared by the general method described in Kung, U.S. Pat. 2,356,459, dated Aug. 22, 1944, wherein a dialkyl ketene is reacted with formaldehyde.

All of the various aluminum trialkyls, whether branched or linear in the alkyl portion of the molecule, are useful.

The lower aluminum trialkyls up to aluminum tripentyl, are preferred. Suitable aluminum trialkyls are aluminum trimethyl, aluminum triethyl, aluminum tri-n-propyl, aluminum tri-n-butyl, aluminum triisobutyl, aluminum tri-n-hexyl, aluminum triisohexyl, aluminum tri-n-octyl.

The quantity of aluminum alkyl required depends entirely on the type and purity of the monomer and the particular aluminum alkyl selected. In any event, enough should be used to remove any traces of $H_2O$, alcohol, acid, or carbonyl containing compounds. A preferred amount, for pivalolactone, will be sufficient aluminum trialkyl to lower the polymerization index of the monomer to less than 15 seconds. Suitable amounts can be calculated by determining a polymerization index on the impure monomer, then adding about 1.00 milliliters of 15% aluminum trialkyl in hydrocarbon solvent per 100 grams of monomer for each 12 to 15 seconds of polymerization index. Excessive amounts of the aluminum trialkyls should not be used as they may initiate polymerization of the monomer. For example, if two to five times or more of the amount of aluminum trialkyl as specified above is added, polymerization of the monomer will generally occur.

In practice, a weighed amount of the impure lactone is treated with a predetermined quantity of the aluminum trialkyl and the purified monomer is subsequently separated from the resultant mixture. A preferred method is by vacuum distillation. In the context of this invention, the impure lactones will normally analyze approximately 99% pure by gas chromatography and have a polymerization index of from about 45 seconds to 120 seconds or greater. The treatment of the impure lactone monomer with the aluminum trialkyl is carried out at essentially room temperature and under an inert atmosphere such as nitrogen. Any gas may be used as long as it is inert to the reactants. Oxygen must normally be excluded as it will react with the aluminum trialkyls.

Temperature is relatively unimportant. It has been found that the solution of impure monomer and aluminum alkyl can be heated to temperatures of 130° C. or more without producing polymerization of the monomer.

This invention will be further illustrated by the following examples of preferred embodiments. It will be understood that these examples are included merely for purposes of illustration and are not intended to limit the scope of the invention.

Inherent viscosity, when referred to in these examples, is measured at 25° C. in 60/40 phenol/tetrachloroethane at 0.5 grams per 100 cc. concentration.

EXAMPLE 1

Pivalolactone is synthesized by any of the known procedures to yield a monomer having a polymerization index of 85 seconds. One hundred grams of the lactone monomer is charged to a clean, dry, 500-ml. flask fitted with a stirrer, reflux condenser, thermowell, and hypodermic syringe injection port. The flask is purged thoroughly with $N_2$. A positive $N_2$ pressure is maintained in the vessel until the distillation step is begun. Five ml. of 15 percent aluminum triethyl in mineral spirits is injected into the lactone with stirring. The stirrer and syringe injection port are removed after about five minutes. One drop of Union Carbide SAG–5310 silicone antifoam and several boiling chips are added. The vessel is set up for flash distillation at reduced pressure. The monomer distills at 38–39° C. at 6 mm. Only a small amount of residue remains in the flask. Yield of recovered monomer is in excess of 90 percent. The polymerization index of the purified monomer is 15 seconds. The inherent viscosity of the polymer obtained from the purified monomer in determining the polymerization index is 1.3 whereas the starting material yielded polymer with an inherent viscosity of only 0.23 at the same monomer-to-initiator mole ratio.

EXAMPLE 2

Twelve hundred grams of pivalolactone having a polymerization index of 60 seconds is charged to a clean, dry three-liter flask fitted with a stirrer, condenser, and thermowell. The flask is purged thoroughly with $N_2$, and a positive pressure maintained on its contents until the distillation phase is begun.

Thirty-six ml. of 25 percent aluminum triisobutyl in heptane is added to the flask with stirring. The stirrer is removed after a few minutes. Twelve drops of Union Carbide SAG–5310 antifoam is added, and the system is set up for flash distillation at reduced pressure. The monomer distills at 38–39° C. at 6 mm. pressure. The base temperature is 40° C. The yield of monomer recovered is 97–98 percent. The polymerization index of the aluminum triisobutyl treated pivalolactone is 8 seconds.

EXAMPLE 3

Impure pivalolactone monomer is treated with various amounts of aluminum triethyl by the same procedure given in Example 2. The results are shown in Table 1.

TABLE 1.—PURIFICATION OF PIVALOLACTONE WITH ALUMINUM TRIETHYL

| Weight of impure pivalolactone monomer grams | Milliliters of aluminum triethyl [1] | Initial polymerization index, seconds | Polymerization index after purification, seconds | Inherent viscosity |
|---|---|---|---|---|
| 100 | 0 | 65 | 65 | 0.19 |
| 100 | 1.00 | 65 | 51 | 0.30 |
| 100 | 2.00 | 65 | 38 | 0.72 |
| 100 | 3.00 | 65 | 13 | 0.95 |
| 100 | 4.00 | 65 | 5.5 | 1.14 |

[1] 15% Aluminum triethyl in mineral spirits.

These results illustrate the relationship between polymerization index and inherent viscosity and the effect of increasing amounts of the aluminum trialkyl. As is readily seen, using the same monomer to initiator mole ratio, an impure pivalolactone monomer with polymerization index of 65 seconds yields a polymer with an inherent viscosity of only 0.19, whereas a purified monomer with a polymerization index of 5.5 seconds yields a polymer with an inherent viscosity of 1.14. The polymer prepared from the 5.5 second polymerization index material has a molecular weight sufficiently high that it is useful in manufacturing fibers, films and molded articles. The polymer obtained from the untreated material using the same monomer to initiator mole ratio and having an inherent viscosity of 0.19 is essentially worthless because the molecular weight is too low and it is brittle.

The novelty and utility of this invention can be further appreciated when compared with several alternate procedures which were examined for purification of the lactones. For example, pivalolactone was stirred over calcium oxide for 24 hours and filtered. The polymerization index before treatment was 90 seconds, and after treatment was 65 seconds. Similar treatment with barium oxide reduced the polymerization index from 90 seconds to 80 seconds. Likewise, pivalolactone was stirred over $CaH_2$ and distilled at reduced pressure. The polymerization index decreased from 90 seconds to 53 seconds. Numerous other alternate procedures were likewise discarded because of either minimal effectiveness or high cost.

The invention has been described in detail with particular reference to certain preferred embodiments thereof, but it will be understood that variations and modifications can be effected within the spirit and scope of the invention.

We claim:
1. A process for purifying impure $\alpha,\alpha$-disubstituted-$\beta$-propiolactones having the formula

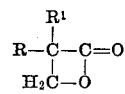

wherein R and $R^1$ individually are straight- or branched-chain alkyl of from 1 to 10 carbon atoms, which comprises the steps of treating said impure α,α-disubstituted-β-propiolactone with about 1 ml. of a 15% solution of an aluminum trialkyl having the formula $AlR^2{}_3$ wherein $R^2$ is a straight- or branched-chain alkyl of from 1 to 8 carbon atoms, per each 12 to 15 seconds reduction in polymerization index per hundred grams of monomer, and subsequently separating purified α,α-disubstituted-β-propiolactone monomer from the resultant mixture.

2. A process of Claim 1 wherein each of R and $R^1$ is a straight- or branched-chain alkyl of from 1 to 4 carbon atoms.

3. A process according to Claim 1 wherein the α,α-disubstituted-β-propiolactone is pivalolactone.

4. A process according to Claim 1 wherein the aluminum trialkyl is selected from the group consisting of aluminum trimethyl, aduminum triethyl, aluminum tri-n-propyl, aluminum tri-n-butyl, aluminum triisobutyl, aluminum tri-n-hexyl, aluminum triisohexyl, and aluminum tri-n-octyl.

5. A process according to Claim 1 wherein the aluminum trialkyl is aluminum triethyl.

6. A process according to Claim 1 wherein the separation of the purified monomer is accomplished by vacuum distillation.

7. A process for producing a polymerization grade pivalolactone monomer having a polymerization index of less than 15 seconds which comprises the steps of adding about 1 ml. of a 15% solution of an aluminum trialkyl having the formula $AlR^2{}_3$, wherein $R^2$ is a straight- or branched-chain alkyl of from 1 to 8 carbon atoms, per each 12 to 15 seconds of polymerization index time reduction per hundred grams of monomer, to the impure monomer having a polymerization index greater than 15 seconds and subsequently separating a polymerization grade pivalolactone from the resultant mixture.

8. A process of Claim 7 wherein the separation of the purified pivalolactone is accomplished by vacuum distillation.

9. A process of Claim 7 wherein the aluminum trialkyl is selected from the group consisting of aluminum trimethyl, aluminum triethyl, aluminum tri-n-propyl, aluminum tri-n-butyl, aluminum triisobutyl, aluminum tri-n-hexyl, aluminum triisohexyl, aluminum tri-n-octyl.

10. A process of Claim 1 wherein the aluminum trialkyl is aluminum triethyl.

References Cited
UNITED STATES PATENTS
3,448,122  6/1969  Klootwijk _____ 260—343.9

DONALD G. DAUS, Primary Examiner

A. M. T. TIGHE, Assistant Examiner